(12) United States Patent
Aono et al.

(10) Patent No.: US 9,131,146 B2
(45) Date of Patent: Sep. 8, 2015

(54) COMMUNICATION DEVICE, IMAGING SYSTEM, AND COMPUTER PROGRAM PRODUCT BEING CAPABLE OF ADJUSTING DISPLAY POSITION IN RESPONSE TO IMAGING DIRECTION AND DIRECTION INSTRUCTION INFORMATION

(71) Applicant: JVC KENWOOD Corporation, Yokohama (JP)

(72) Inventors: Keisuke Aono, Kamakura (JP); Yukihiko Murakami, Kawasaki (JP)

(73) Assignee: JVC KENWOOD Corporation, Yokohama-shi (JP)

(*) Notice: Subject to any disclaimer, the term of this patent is extended or adjusted under 35 U.S.C. 154(b) by 226 days.

(21) Appl. No.: 13/852,474

(22) Filed: Mar. 28, 2013

(65) Prior Publication Data
US 2013/0258125 A1 Oct. 3, 2013

(30) Foreign Application Priority Data
Mar. 29, 2012 (JP) .................................. 2012-076810

(51) Int. Cl.
*H04N 5/232* (2006.01)
(52) U.S. Cl.
CPC ....... *H04N 5/23216* (2013.01); *H04N 5/23206* (2013.01); *H04N 5/23274* (2013.01)
(58) Field of Classification Search
CPC .............. H04N 5/232; H04N 5/23203; H04N 5/23206; H04N 5/23216
USPC .............................. 348/211.99, 211.1–211.14
See application file for complete search history.

(56) References Cited

U.S. PATENT DOCUMENTS

| | | | | |
|---|---|---|---|---|
| 6,147,701 A * | 11/2000 | Tamura et al. | ................... | 348/36 |
| 6,445,411 B1 * | 9/2002 | Shibata et al. | ........... | 348/211.99 |
| 6,909,457 B1 * | 6/2005 | Fukasawa | ................ | 348/211.11 |
| 2003/0165192 A1 * | 9/2003 | Kitta | ........................ | 375/240.01 |
| 2012/0057037 A1 * | 3/2012 | Ono | ........................... | 348/211.9 |
| 2013/0100306 A1 * | 4/2013 | Bekiares et al. | ......... | 348/211.99 |

FOREIGN PATENT DOCUMENTS

| | | |
|---|---|---|
| JP | 09-261522 | 10/1997 |
| JP | 10-224772 A | 8/1998 |
| JP | 2008-131475 A | 6/2008 |

OTHER PUBLICATIONS

Office Action in Japanese Patent Application No. 2012-076810 dated May 26, 2015.

* cited by examiner

*Primary Examiner* — Kelly L Jerabek
(74) *Attorney, Agent, or Firm* — Venable LLP; Michael A. Sartori; Todd R. Farnsworth

(57) ABSTRACT

A communication device includes: a receiving unit that receives image data generated by an imaging process of an imaging device facing a predetermined imaging direction and imaging direction information representing the predetermined imaging direction; an operating unit that generates direction instruction information indicating an imaging direction of the imaging device in response to an operation of the user; an image clipping unit that clips a predetermined region of the image data; a display unit that displays an image based on the image data of the predetermined region; and a region position adjusting unit that adjusts a position of the predetermined region in the image data based on the imaging direction information and the direction instruction information.

3 Claims, 8 Drawing Sheets

COMMUNICATION DEVICE, IMAGING SYSTEM, AND COMPUTER PROGRAM PRODUCT BEING CAPABLE OF ADJUSTING DISPLAY POSITION IN RESPONSE TO IMAGING DIRECTION AND DIRECTION INSTRUCTION INFORMATION

CROSS-REFERENCE TO RELATED APPLICATIONS

The present application claims priority to and incorporates by reference the entire contents of Japanese Patent Application No. 2012-076810 filed in Japan on Mar. 29, 2012.

BACKGROUND OF THE INVENTION

1. Field of the Invention

The present invention relates to a communication device, an imaging device, an imaging system, and a computer program product.

2. Description of the Related Art

There has been known a video camera that can be operated using a wireless communication terminal such as smartphones or tablet terminals. The video camera receives an operation signal transmitted from a wireless communication terminal via a wireless communication path such as Wi-Fi, and executes an operation (a recording start, a recording stop, a pan operation, a tilt operation, a zooming operation, or the like) corresponding to the operation signal.

For example, Japanese Laid-open Patent Publication No. 9-261522 discloses a video delivery method of delivering a video of a partial clipping region (a partial region) included in the entire region video imaged by a video camera to an operating terminal and causing the video of the partial region to be displayed on the operating terminal. The position of the partial region in the entire region is movable according to a movement request transmitted from the operating terminal.

However, when an imaging device capable of moving the position of the partial region and changing an imaging direction of the video camera (changing the position of the entire region) by a pan tilt operation is taken into consideration, it is necessary to adjust both the position of the partial region and the imaging direction of the video camera so as to image a desired subject. Further, since an imaging direction change operation signal is transmitted to the video camera via a communication path, a time lag (delay) of a certain period of time occurs until a video in which a corresponding operation is reflected is displayed after a pan tilt operation is performed. Thus, there is a problem in that it is difficult to image a subject desired by a user. In addition, Japanese Laid-open Patent Publication No. 9-261522 does not disclose any technique of changing the imaging direction of the video camera.

The present invention is made to solve the above problem, and it is an object of the present invention to provide a communication device, an imaging device, an imaging system, and a computer program product, which are capable of easily imaging a desired subject.

SUMMARY OF THE INVENTION

It is an object of the present invention to at least partially solve the problems in the conventional technology.

According to an aspect of the present invention a communication device includes: a receiving unit that receives image data generated by an imaging process of an imaging device facing a predetermined imaging direction and imaging direction information representing the predetermined imaging direction; an operating unit that generates direction instruction information indicating an imaging direction of the imaging device in response to an operation of the user; an image clipping unit that clips a predetermined region of the image data; a display unit that displays an image based on the image data of the predetermined region; and a region position adjusting unit that adjusts a position of the predetermined region in the image data based on the imaging direction information and the direction instruction information.

Through this configuration, the position of the predetermined region to be clipped by the operating terminal is also changed with the change in the imaging direction of the imaging device. Thus, even when the position of the subject in the generated image data changes, the relative position between the clipping region and the subject does not change. As a result, the position of the subject displayed on the display unit does not change either. Thus, the display unit can display the stable image.

According to another aspect of the present invention the communication device further includes: an operation start detecting unit that detects that the user starts an operation of giving an instruction for an imaging direction of the imaging device; a size change instructing unit that generates size change instruction information instructing the imaging device to change an image size of the image data to be transmitted by the imaging device from a first size to a second size larger than the first size; and a transmitting unit that transmits the size change instruction information to the imaging device, and when the operation start detecting unit detects that the user starts an operation, the size change instructing unit generates the size change instruction information, and transmits the size change instruction information to the imaging device via the transmitting unit.

According to still another aspect of the present invention, the operation start detecting unit of the communication device includes an approach detecting unit that detects that the hand of the user approaches the operating unit, and when the approach detecting unit detects approach of the hand of the user, the size change instructing unit generates the size change instruction information, and transmits the size change instruction information to the imaging device via the transmitting unit.

According to still another aspect of the present invention when the image data received by the receiving unit of the communication device is an image with the first size, the image clipping unit does not perform clipping of the image data of the predetermined region, and the display unit displays an image based on the image data received by the receiving unit.

According to still another aspect of the present invention an imaging device includes: an imaging unit that generates image data by an imaging process; a transmitting unit that transmits the image data generated by the imaging unit to an operating terminal; a receiving unit that receives size change instruction information which is an instruction for changing an image size of the image data to be transmitted by the operating terminal, the size change instruction information being transmitted from the operating terminal; and a size changing unit that changes the image size of the image data to be transmitted via the transmitting unit from a first size to a second size larger than the first size based on the size change instruction information.

According to still another aspect of the present invention the size changing unit of the imaging device changes the image size of the image data to be transmitted via the transmitting unit from the second size to the first size based on the size change instruction information.

According to still another aspect of the present invention an imaging system includes: an imaging device; and a communication device that operates the imaging device, and the imaging device is connected with the communication device via a communication path, the imaging device includes an imaging unit that generates image data through an imaging process, an imaging direction detecting unit that detects an imaging direction in which the imaging unit performs an imaging process, and a transmitting unit that transmits the image data and imaging direction information representing an imaging direction detected by the imaging direction detecting unit to the communication device, and the communication device includes a receiving unit that receives the image data and the imaging direction information, an operating unit that generates direction instruction information indicating an imaging direction of the imaging device in response to an operation of the user, an image clipping unit that clips a predetermined region of the image data, a display unit that displays an image based on the image data of the predetermined region, and a region position adjusting unit that adjusts a position of the predetermined region in the image data based on the imaging direction information and the direction instruction information.

Through this configuration, the position of the predetermined region to be clipped by the operating terminal is also changed with the change in the imaging direction of the imaging device. Thus, even when the position of the subject in the generated image data changes, the relative position between the clipping region and the subject does not change. As a result, neither does the position of the subject displayed on the display unit change. Thus, the display unit can display the stable image.

A computer program product according to an embodiment of the present invention causes a computer to execute: receiving image data generated by an imaging process of an imaging device (1) facing in a predetermined imaging direction and imaging direction information representing the predetermined imaging direction; generating direction instruction information indicating an imaging direction of the imaging device (1) in response to an operation of the user; clipping a predetermined region of the image data; displaying an image based on the image data of the predetermined region; and adjusting a position of the predetermined region in the image data based on the imaging direction information and the direction instruction information.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Figure 1:
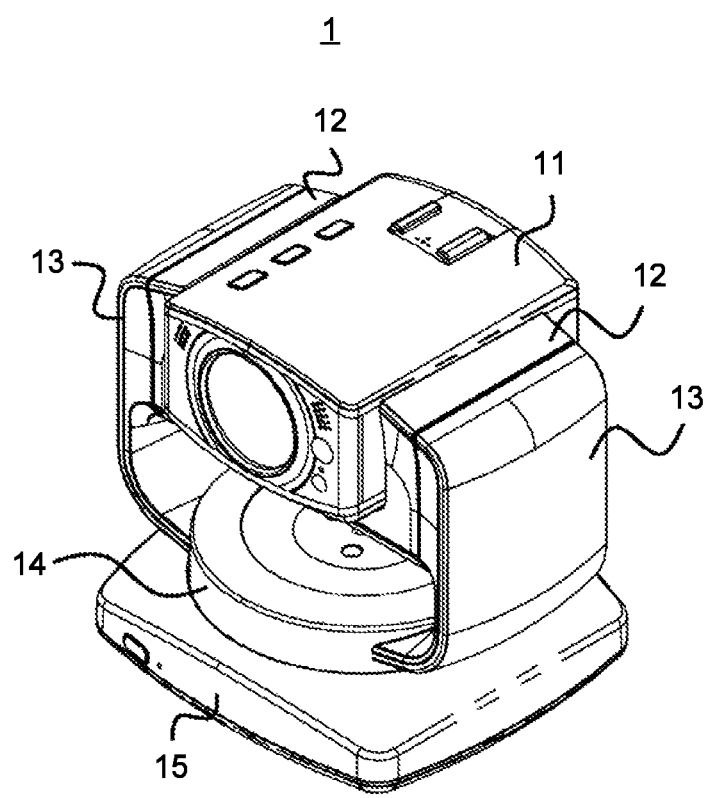
FIG. 1 is an external appearance view of an imaging device according to an embodiment.

Hereinafter, exemplary embodiments of the present invention will be described with reference to the accompanying drawings. An imaging device 1 according to the present embodiment includes a digital camera capable of imaging a moving image and a still image. FIG. 1 is an external appearance perspective view of the imaging device 1.

As illustrated in FIG. 1, the imaging device 1 includes a main body unit 11, a support unit 12, an arm unit 13, a rotating base 14, and a fixed base 15.

The main body unit 11 is a housing that stores a lens unit including a plurality of lenses, an imaging element, a battery, a Wi-Fi module, and the like. A lens is mounted to the front side of the main body unit 11. The main body unit 11 performs wireless communication with an operating terminal which will be described later, and operates according to an instruction signal transmitted from the operating terminal.

The support unit 12 supports the main body unit 11. The both ends of the support unit 12 in the horizontal direction are rotatably connected to the arm unit 13. Thus, the support unit 12 can rotate in a pitch direction using the horizontal direction as an axis. One end of the arm unit 13 is connected to the support unit 12. The other end of the arm unit 13 is fixed to the side of the rotating base 14.

The rotating base 14 is disc-shaped, and the arm units 13 are fixed at the opposite positions of the side (the periphery). The rotating base 14 is rotatably connected to the fixed base 15. Thus, the rotating base 14 can rotate in a yaw direction using the vertical direction as an axis. Through the above described configuration, the main body unit 11 is supported to be positioned above the fixed base 15, and can perform a pan operation (rotation in the yaw direction) and a tilt operation (rotation in the pitch direction). The pan tilt operation is implemented by driving a motor (not illustrated). In other words, the support unit 12, the arm unit 13, the rotating base 14, and the fixed base 15 function as a camera platform capable of performing the pan tilt operation.

Figure 2:
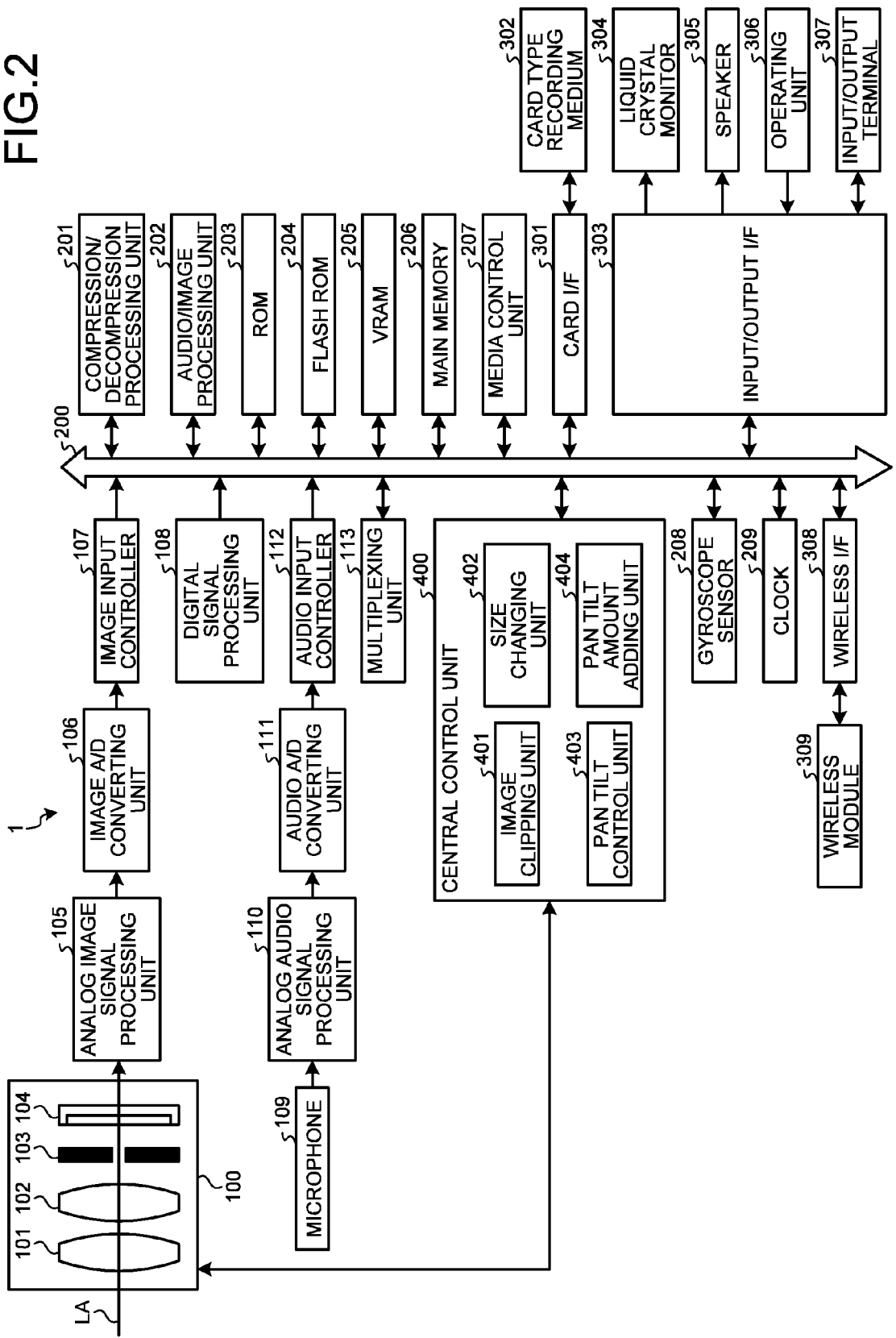
FIG. 2 is a block diagram of an imaging device according to an embodiment.

An internal configuration of the main body unit 11 of the imaging device 1 will be described. FIG. 2 is a block diagram of the main body unit 11 according to the present embodiment. The main body unit 11 includes an imaging unit 100 which is configured with a zoom lens 101, a focus lens 102, a diaphragm 103, and an imaging element 104. The zoom lens 101 is moved along an optical axis LA by a zoom actuator (not illustrated). Similarly, the focus lens 102 is moved along the optical axis LA by a focus actuator (not illustrated). The diaphragm 103 is driven by a diaphragm actuator (not illustrated) and performs an operation. The imaging element 104 is configured with an imaging element of a charge coupled device (CCD) type or a complementary metal oxide semiconductor (CMOS) type.

An imaging operation using the imaging device 1 is performed by the following process. The imaging element 104 performs a photoelectric conversion on light that has passed through the zoom lens 101, the focus lens 102, and the diaphragm 103 to generate an analog image signal of a subject. An analog image signal processing unit 105 amplifies the analog image signal, and an image A/D converting unit 106 converts the amplified signal into digital image data. An image input controller 107 receives the digital image data output from the image A/D converting unit 106 as imaging data, and stores the imaging data in a main memory 206 via a bus 200.

A digital signal processing unit 108 acquires the imaging data stored in the main memory 206 based on an instruction from a central control unit 400 via the bus 200, executes predetermined signal processing on a RGB signal, and generates data including a brightness signal and a color difference signal. The digital signal processing unit 108 further performs various kinds of digital correction such as an offset process, a white balance adjustment process, a gamma correction process, a RGB compensation process, a noise reduction process, a contour correction process, a tone correction process, and a light source type determining process.

A microphone 109 collects an ambient sound at the time of imaging to generate an analog audio signal. An analog audio signal processing unit 110 amplifies the analog audio signal, and an audio A/D converting unit 111 converts the amplified signal into digital audio data. An audio input controller 112 stores the digital audio data output from the audio A/D converting unit 111 together with the imaging data in the main memory 206.

A multiplexing unit 113 multiplexes the imaging data and the digital audio data stored in the main memory 206 to generate stream data.

A compression/decompression processing unit 201 executes a predetermined compression process on the stream data stored in the main memory 206 according to an instruction from the central control unit 400 via the bus 200, and generates compressed data. Further, the compression/decompression processing unit 201 executes a decompression process of a predetermined format on the compressed data stored in a card type recording medium 302 or the like according to an instruction from the central control unit 400, and generates decompressed data. The imaging device 1 according to the present embodiment employs a compression method conforming to the JPEG standard for still images and a compression method conforming to the MPEG2 standard or the AVC/H.264 standard for moving images.

An audio/image processing unit 202 executes predetermined image processing on digital data read out from the main memory 206 according to an instruction of the central control unit 400 via the bus 200. For example, the audio/image processing unit 202 generates image data for various kinds of processes such as a menu image or an OSD image, causes the image data to be superimposed on original imaging data read from the main memory 206, and outputs the superimposed image data to a liquid crystal (LC) monitor 304. Through this output operation, an image in which various kinds of image data are synthesized is displayed on the LC monitor 304. Here, instead of the LC monitor 304, any other monitor such as an organic electro-luminescence (EL) monitor may be used.

A ROM 203 is connected to the central control unit 400 via the bus 200, and stores a control program executed by the central control unit 400, a variety of data necessary for control, and the like. A flash ROM 204 stores various kinds of setting information related to an operation of the imaging device 1 such as setting information of the user. For example, in accordance with various imaging situations; the imaging device 1 stores several imaging modes and settings of imaging conditions according to each mode in the flash ROM 204 in advance. Further, the user selects an optimal mode from among the modes before the imaging operation starts, so that the imaging operation may be executed at the optimal imaging condition. For example, examples of the imaging mode include a "portrait mode" suitable for imaging of a specific person, a "sport mode" suitable for imaging of a sports day or the like, a "night view mode" suitable for imaging of a dark place such as a night view or the like. A VRAM 205 is used as a temporary storage region of display imaging data.

The main memory 206 is used as a temporary storage region of imaging data (a moving image and a still image). The main memory 206 causes imaging data held therein to be stored in the card type recording medium 302 according to an instruction of the central control unit 400.

A media control unit 207 controls an operation of writing or reading data in or from the card type recording medium 302 via a card I/F 301 according to an instruction of the central control unit 400. The card type recording medium 302 is an external memory such as an SD card or a compact flash (a registered trademark), and removably mounted to the imaging device 1.

A gyroscope sensor 208 (an imaging direction detecting unit) detects a change in acceleration and an angular velocity of three axes, and detects a pan tilt amount of the imaging device 1 and vertical and horizontal camera shake amounts. The imaging direction detecting unit is not limited to the gyroscope sensor, and may include a direction sensor, for example. It is possible to specify the imaging direction of the imaging device 1 based on the pan tilt amount of the imaging device 1. A clock 209 generates information of an image data generation date and time.

The LC monitor 304, a speaker 305, an operating unit 306, and an input/output (I/O) terminal 307 are connected to an I/O I/F 303. For example, the LC monitor 304 displays an image generated from various kinds of image data such as an imaging data and various kinds of menu image data which are temporarily recorded in the VRAM 205 or the main memory 206. For example, the speaker 305 outputs a sound temporarily recorded in the main memory 206. The operating unit 306 includes an operation key including a release switch and a power switch, a cross key, a joy stick, a touch panel superimposed on the LC monitor 304, or the like, and receives the operation input on the imaging device 1 by the user. The I/O terminal 307 is connected to a camera platform (see FIG. 1) capable of performing the pan tilt operation, a television monitor, a personal computer (PC), or the like.

A wireless module 309 transmits or receives a signal to or from the operating terminal via the bus 200 and a wireless I/F 308. Specifically, the wireless module 309 performs communication processing conforming to a wireless LAN standard such as Wi-Fi, thus, communication with the operating terminal can be performed.

The central control unit 400 is configured with a semiconductor integrated circuit (IC) including a central processing unit (CPU), a read only memory (ROM) storing various kinds of programs, a random access memory (RAM) functioning as a work area, and the like, and generally controls processing of the whole imaging device 1 such as transmission and reception of information related to the imaging operation, a display of various kinds of images, and collaborative shooting. The central control unit 400 includes an image clipping unit 401, a size changing unit 402, a pan tilt control unit 403, and a pan tilt amount adding unit 404.

The image clipping unit 401 clips image data to be transmitted to the operating terminal from image data generated by the imaging process. The image clipping unit 401 clips image data with an image size (the size of an image) designated by the size changing unit 402. The image clipping unit 401 outputs the clipped image data to the wireless module 309. The wireless module 309 transmits the clipped image data to the operating terminal via a wireless communication path.

The size changing unit 402 changes the image size of the image data to be transmitted from the imaging device 1 to the operating terminal based on a size change instruction signal. Specifically, the size changing unit 402 changes the image size of the image data to be transmitted to the operating terminal from a normal image size to an enlarged image size or from the enlarged image size to the normal image size. At this time, the normal image size refers to the size of an image having pixels which correspond in number to the number of pixels of a display unit of the operating terminal. The enlarged image size refers to an image size larger than the normal image size. The enlarged image size may be an image size of image data generated by the imaging process of the imaging unit 100 or may be an image size which is smaller than an image size of the image data generated by the imaging process and larger than the normal image size. The size change instruction signal is a signal giving an instruction for changing the image size of the image data to be transmitted from the imaging device 1. The size change instruction signal is transmitted from the operating terminal to the imaging device 1 based on whether or not the user has approached the operating unit of the operating terminal.

When the size change instruction signal for changing the image size to the enlarged image size is received, the size changing unit 402 changes the image size of the image data clipped by the image clipping unit 401 from the normal image size (a first size, and for example, 960 pixels×540 pixels) to the enlarged image size (a second size, and for example, 1920 pixels×1080 pixels). Further, the size changing unit 402 causes the image data with the enlarged image size to be transmitted until the size change instruction signal for changing the image size to the normal image size is received again from the operating terminal.

However, when the size changing unit 402 receives the size change instruction signal for changing the image size to the normal image size; the size changing unit 402 changes the image size of the image data to be transmitted to the operating terminal from the enlarged image size to the normal image size. Further, the size changing unit 402 causes the image data with the normal image size to be transmitted until the size change instruction signal for changing the image size to the enlarged image size is received again from the operating terminal.

The pan tilt control unit 403 generates a control signal for executing the pan operation and the tilt operation based on a signal (direction instruction information) instructing execution of the pan operation and the tilt operation which is transmitted from the operating terminal. The pan tilt control unit 403 outputs the generated control signal to a motor (not illustrated) of the camera platform illustrated in FIG. 1. Thus, the imaging device 1 mounted on the camera platform rotates in the pan direction or the tilt direction. The pan direction refers to the horizontal direction, and the tilt direction refers to the vertical direction.

The pan tilt amount adding unit 404 adds information (imaging direction information) representing a predetermined imaging direction to the image data generated by the imaging process of the imaging device 1 facing in the predetermined imaging direction. Specifically, the pan tilt amount adding unit 404 adds information representing a pan amount (a pan angle) and a tilt amount (a tilt angle) detected by the gyroscope sensor 208 to each image data (each frame) as the imaging direction information. Thus, the operating terminal receives the image data generated by the imaging device 1 and the imaging direction information in which the image is imaged.

Figure 3:
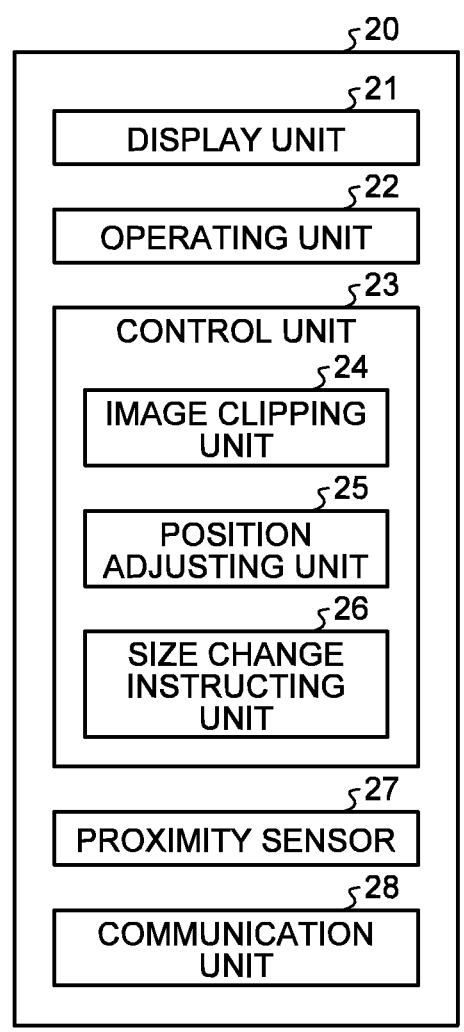
FIG. 3 is a block diagram of an operating terminal according to an embodiment.

Next, an operating terminal 20 (a communication device) for remotely operating the imaging device 1 will be described. FIG. 3 is a block diagram illustrating a configuration example of the operating terminal 20 according to the present embodiment. The operating terminal 20 includes a display unit 21, an operating unit 22, a control unit 23, a proximity sensor 27, and a communication unit 28.

The display unit 21 is, for example, a liquid crystal display (LCD) or an organic EL, and displays a moving image based on image data of each frame transmitted from the imaging device 1. The operating unit 22 is, for example, a pan operation button, a tilt operation button, a recording start button, a recording stop button, a telescopic button, a wide angle button, or the like.

When each button of the operating unit 22 is pushed down, the control unit 23 generates a control signal corresponding to the corresponding button. For example, when the pan operation button is pushed down, the control unit 23 generates a control signal (hereinafter, referred to as a "pan operation signal") for instructing the imaging device 1 to perform the pan operation. When the tilt operation button is pushed down, the control unit 23 generates a control signal (hereinafter, referred to as a "tilt operation signal") for instructing the imaging device 1 to perform the tilt operation. The pan operation signal and the tilt operation signal are direction instruction information indicating the imaging direction of the imaging device 1, and are signals including a target value of a pan tilt angle, a pan tilt amount, and the like.

The operating unit 22 may be a push button or a touch panel. For example, when an operation program is downloaded to a smartphone, and the smartphone is used as the operating terminal 20, the display unit 21 may be used as the operating unit 22. In this case, the control unit 23 may generate a pan tilt operation instruction signal when a finger of the user swipes on the display unit 21 vertically or horizontally. For example, the pan angle or the tilt angle may be decided according to the swiping speed or amount. Further, an acceleration sensor may be installed in a smartphone, and a pan tilt operation instruction may be given when the terminal itself of the smartphone is inclined vertically or horizontally. Of course, the operating terminal 20 is not limited to smartphones or tablet terminals and may be a head mount display device mounted on the head of the user, for example. In the case of the head mount display device, a pan operation instruction may be given to the imaging device 1 when the user wearing the head mount display device shakes his/her head horizontally. Further, the tilt operation instruction may be given to the imaging device 1 when the user shakes his/her head vertically.

The control unit 23 is configured with a semiconductor IC including a CPU, a ROM storing various kinds of programs, and a RAM functioning as a work area, and generally controls processing of the entire operating terminal 20 such as a display of various kinds of images. The control unit 23 includes an image clipping unit 24, a position adjusting unit 25, and a size change instructing unit 26.

The image clipping unit 24 clips image data of a predetermined region from the image data transmitted from the imaging device 1. The image clipping unit 24 outputs the image data of the clipped predetermined region to the display unit 21. Thus, an image corresponding to the image data of the predetermined region is displayed on the display unit 21. The predetermined region is a central region of the image data transmitted from the imaging device 1 in an initial state (before the user performs the pan tilt operation); and the size (the number of pixels) of the region is smaller than the image data transmitted from the imaging device 1 and appropriately decided according to the image size (the number of pixels) of the display unit 21. In the present embodiment, the image size of the predetermined region is the same size as the normal image size.

The position adjusting unit 25 adjusts the position of the predetermined region in the received image data based on the imaging direction information received from the imaging device 1. The position adjusting unit 25 adjusts the position of the predetermined region in the received image data according to an operation of the operating unit 22. In other words, the position adjusting unit 25 gives the image clipping unit 24 instructions about the position of a predetermined region to be clipped based on the imaging direction information and the pan tilt operation in the operating unit 22.

The size change instructing unit 26 instructs the imaging device 1 to change the image size of the image data to be transmitted by the imaging device 1 from the enlarged image size to the normal image size or from the normal image size to the enlarged image size. The size change instructing unit 26 generates the size change instruction signal for giving an instruction for changing the image size of the image data to be transmitted by the imaging device 1 based on a detection result of the proximity sensor 27 which will be described later, and transmits the size change instruction signal to the imaging device 1 via the communication unit 28.

The proximity sensor 27 (an approach detecting unit) detects that the hand of the user approaches the operating unit 22. Specifically, when the operating unit 22 is a touch panel, the proximity sensor 27 detects that the hand of the user approaches the touch panel. In other words, the proximity sensor 27 is an operation start detecting unit that detects that the user starts to operate the operating unit 22. For example, the proximity sensor 27 includes a light emitting unit (not illustrated) that outputs an infrared ray and a light receiving unit (not illustrated) that receives the infrared ray which is output from the light emitting unit and reflected from an object. The proximity sensor 27 outputs a value corresponding to the amount of received light of the infrared ray reflected from the object. Thus, it is possible to detect whether or not the object gets close to the proximity sensor 27 up to a predetermined distance. Of course, an object's approach may be detected using any other known technique. Preferably, the proximity sensor 27 is arranged at the position at which the approach of the hand of the user toward the operating unit 22 can be detected or at a vicinity of the operating unit 22. For example, when the operating unit 22 is a touch panel, the proximity sensor 27 is preferably arranged at a vicinity of the outer circumference of the touch panel.

A detecting unit other than the proximity sensor 27 may be used as the operation start detecting unit capable of detecting that the user starts the pan tilt operation. In the configuration in which the pan tilt operation is performed when the smartphone is inclined vertically or horizontally, it is preferable to detect that the user has gripped the smartphone in order to incline the smartphone. For example, it may be determined that the user starts the pan tilt operation when the fingers come into contact with both left and right outer edges of the smartphone, as a trigger. In this case, contact sensors installed on the left and right outer edges function as the operation start detecting unit. Further, in the head mount display device, movement of a line of sight (movement of an eyeball) of the user is detected, and it may be determined that the user starts the pan tilt operation when the line of sight has moved by a predetermined distance in the front direction, as a trigger. In this case, a line of sight movement detecting sensor functions as the operation start detecting unit.

The communication unit 28 performs a wireless communication process of Wi-Fi or the like, and transmits the pan tilt operation signal, the size change instruction signal, and various kinds of control signals to the imaging device 1. Further, the communication unit 28 receives the image data to which the imaging direction information is added for each frame, which is transmitted from the imaging device 1.

Figure 4:
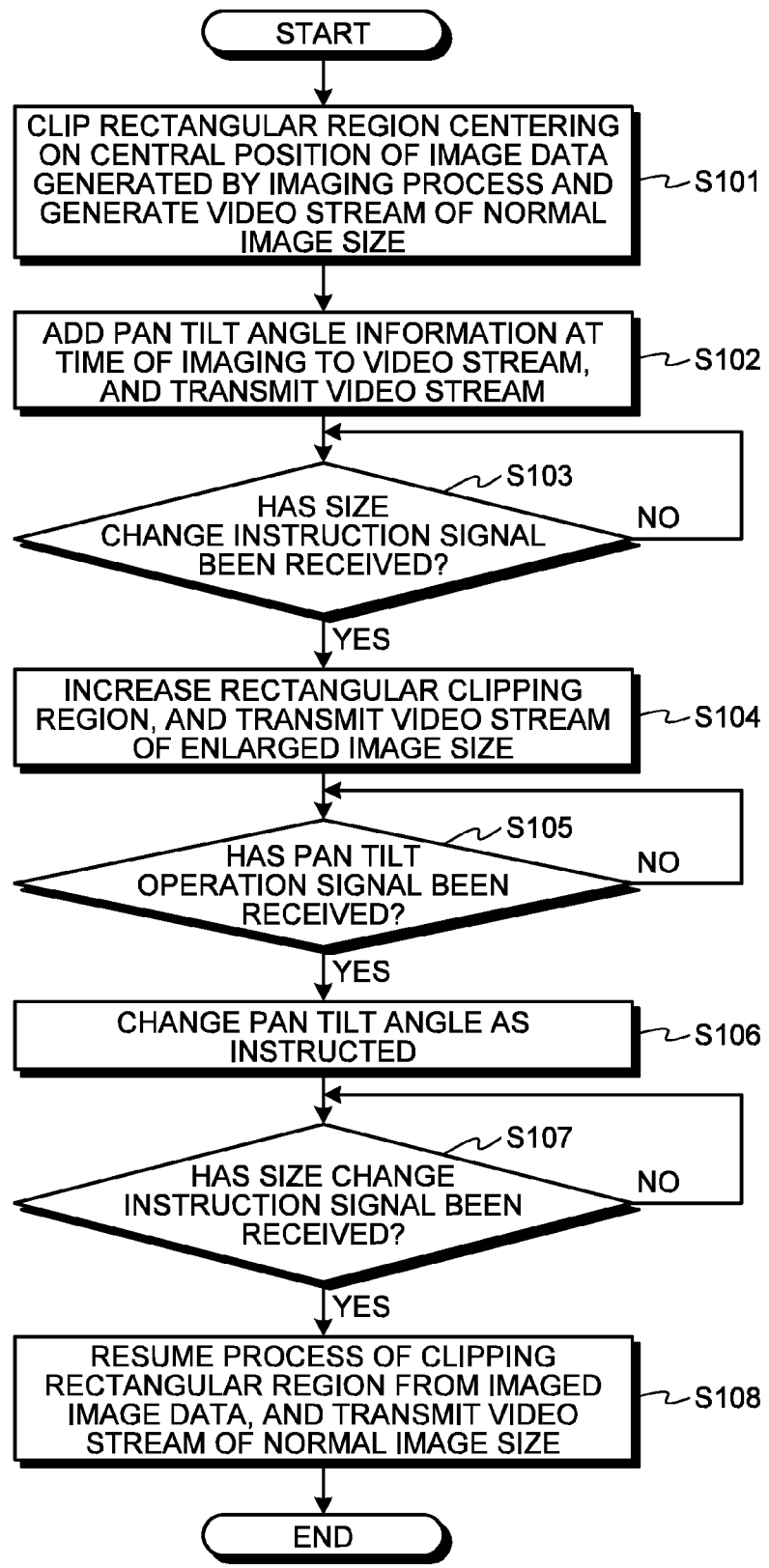
FIG. 4 is a flowchart illustrating an operation of an imaging device according to an embodiment.
Figure 5:
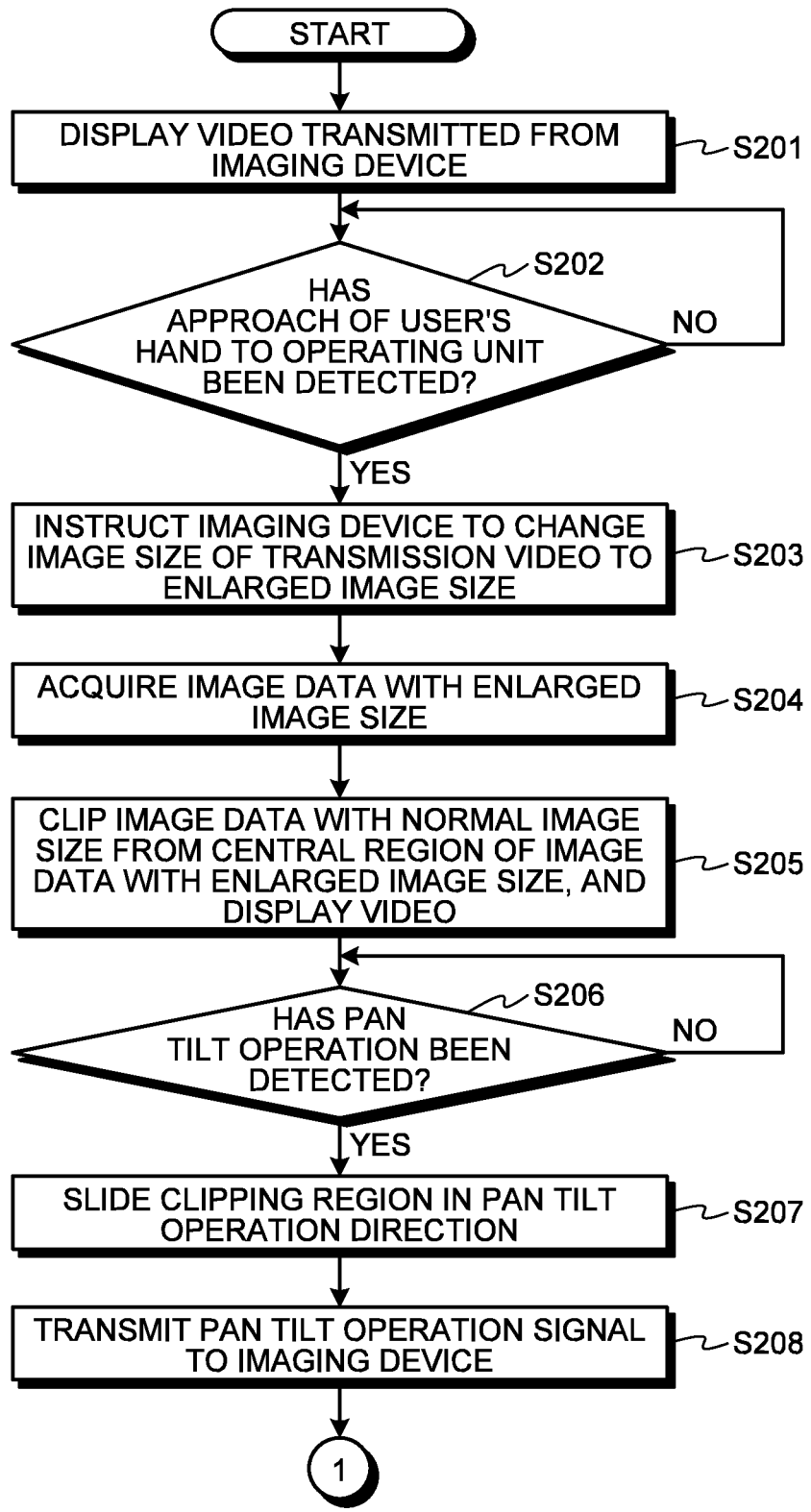
FIG. 5 is a flowchart illustrating an operation of an operating terminal according to an embodiment.
Figure 6:
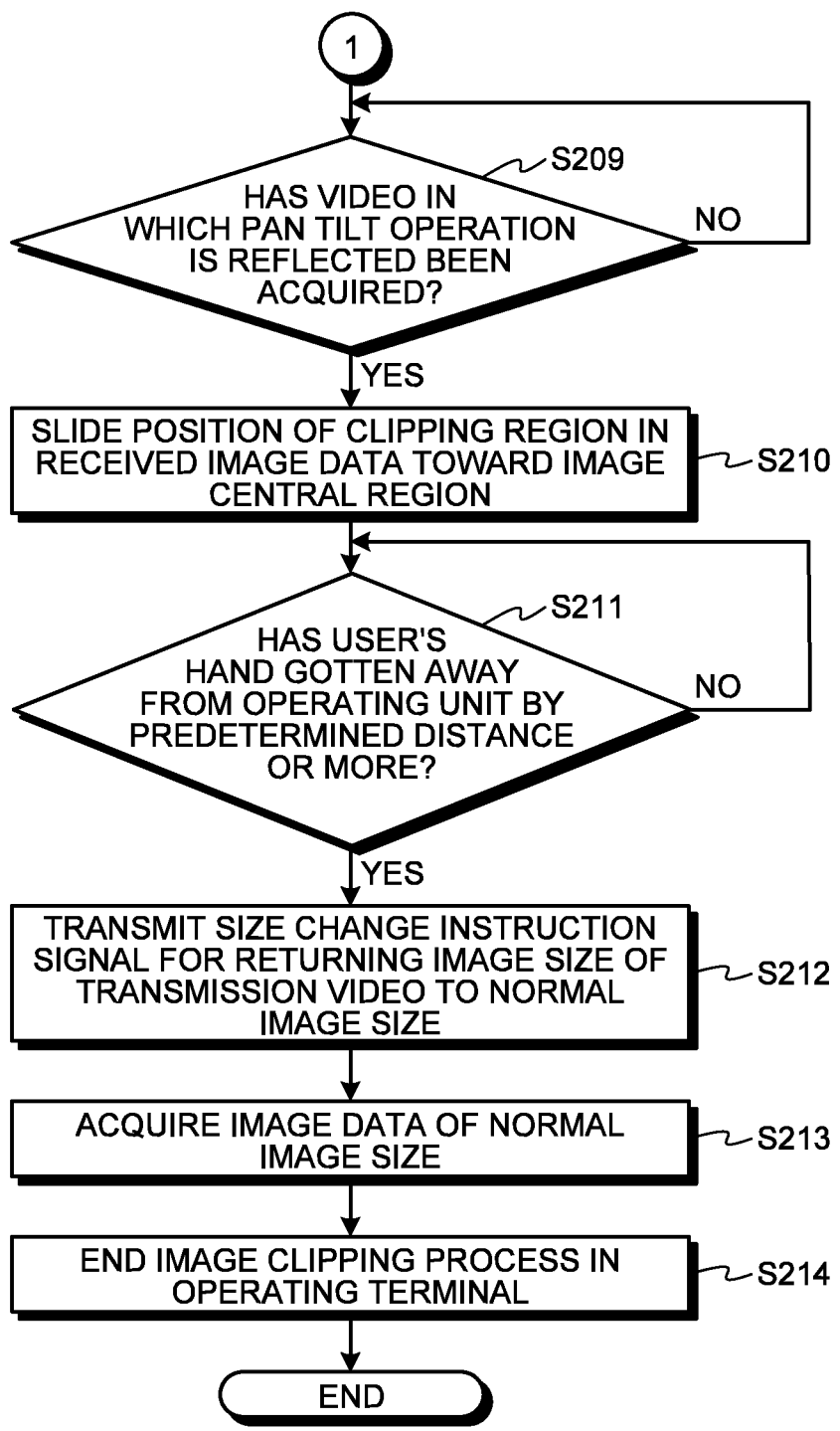
FIG. 6 is a flowchart illustrating an operation of an operating terminal according to an embodiment.

Next, an operation example of the imaging device 1 according to the present embodiment will be described with reference to flowcharts of FIGS. 4 to 6. FIG. 4 is a flowchart illustrating an operation of the imaging device 1. FIGS. 5 and 6 are flowcharts illustrating an operation of the operating terminal 20.

An operation example of the imaging device 1 will be described with reference to FIG. 4. First of all, the image clipping unit 401 clips image data with the normal image size from image data generated by the imaging process (step S101). Specifically, the image clipping unit 401 clips image data of a rectangular region centering on the central position of the generated image data. Then, the multiplexing unit 113 generates a video stream using the clipped image data.

The pan tilt amount adding unit 404 acquires the imaging direction information at the time of imaging of the generated image data from the gyroscope sensor 208. The pan tilt amount adding unit 404 adds the imaging direction information to the generated video stream. Then, the video stream including the imaging direction information is transmitted to the operating terminal 20 by the wireless module 309 (step S102). As a result, the operating terminal 20 receives the video stream with the normal image size including the imaging direction information.

The size changing unit 402 determines whether or not the size change instruction signal for increasing the image size of image data to be transmitted has been received from the operating terminal 20 (step S103). When it is determined that the size change instruction signal has not been received (No in step S103), the size changing unit 402 causes the image clipping unit 401 to continue the process of clipping the image data with the normal image size.

When it is determined that the size change instruction signal has been received (Yes in step S103), the size changing unit 402 instructs the image clipping unit 401 to change the clipping size of the image data from the normal image size to the enlarged image size. The image clipping unit 401 broadens a rectangular clipping region and clips image data with the enlarged image size according to an instruction from the size changing unit 402. Then, similarly to step S102, the multiplexing unit 113 generates video stream using the image data with the enlarged image size. Then, the pan tilt amount adding unit 404 adds the imaging direction information to the corresponding video stream. The video stream including the imaging direction information is transmitted to the operating terminal 20 through the wireless module 309 (step S104). As a result, the operating terminal 20 receives the video stream with the enlarged image size including the imaging direction information.

The pan tilt control unit 403 determines whether or not the direction instruction information has been received from the operating terminal 20. In other words, the pan tilt control unit 403 determines whether or not the pan operation signal or the tilt operation signal (hereinafter, referred to as a "pan tilt operation signal") has been received from the operating terminal 20 (step S105). When it is determined that the pan tilt operation signal has not been received (No in step S105), the pan tilt control unit 403 continues the imaging process while maintaining the current imaging direction.

When it is determined that the pan tilt operation signal has been received (Yes in step S105), the pan tilt control unit 403 obtains the pan amount or the tilt amount corresponding to the pan tilt operation signal, and outputs a driving control signal for driving a motor installed on the camera platform. As a result, the imaging direction of the imaging device 1 is changed to the pan angle and the tilt angle according to the instruction of the operating terminal 20 (step S106).

The size changing unit 402 determines whether or not the size change instruction signal for returning the image size of the image data to be transmitted to the operating terminal 20 to the normal image size (the original image size) has been received (step S107). When it is determined that the size change instruction signal has not been received from the operating terminal 20 (No in step S107), the size changing unit 402 does not change the clipping size of the image data from the enlarged image size.

When it is determined that the size change instruction signal has been received from the operating terminal 20 (Yes in step S107), the size changing unit 402 instructs the image clipping unit 401 to change the clipping size of the image data from the enlarged image size to the normal image size. The image clipping unit 401 decreases the rectangular clipping region and clips the image data with the normal image size (the original image size) according to the instruction from the size changing unit 402. Then, similarly to step S102, the multiplexing unit 113 generates a video stream using the image data with the normal image size. Then, the pan tilt amount adding unit 404 adds the imaging direction information to the video stream. The video stream including the imaging direction information is transmitted to the operating terminal 20 by the wireless module 309 (step S108).

Next, an operation example of the operating terminal 20 will be described with reference to FIGS. 5 and 6. First of all, the communication unit 28 receives the video stream transmitted from the imaging device 1 via a wireless communication path. At this time, the image data of the received video stream is image data with the normal image size (the video stream transmitted by the imaging device 1 in step S102 of FIG. 4). The display unit 21 displays a video based on the received video stream (step S201).

The proximity sensor 27 determines whether or not the hand of the user has approached the operating unit 22 (step S202). When it is determined that the hand of the user has not approached the operating unit 22, that is, when the proximity sensor 27 does not detect approach of an object (No in step S202), the display unit 21 of the operating terminal 20 keeps displaying the received video stream.

However, when it is determined that the hand of the user has approached the operating unit 22, that is, when the proximity sensor 27 detects approach of an object (Yes in step S202), the size change instructing unit 26 generates the size change instruction signal for increasing the image size of the video stream (for changing the image size to the enlarged image size), and outputs the size change instruction signal to the communication unit 28. As a result, the size change instruction signal is transmitted to the imaging device 1 (step S203).

Thereafter, the communication unit 28 receives the video stream with the enlarged image size which is transmitted from the imaging device 1 in step 5104 of FIG. (step S204). Upon receiving the image data with the enlarged image size, the image clipping unit 24 clips image data with the normal image size (a predetermined region) from the central portion of the image data, and outputs the clipped image data to the display unit 21. The display unit 21 displays the video of the clipped image size (step S205).

Thereafter, the position adjusting unit 25 determines whether or not the user has given an instruction of the pan tilt operation using the operating unit 22 (step S206). When it is determined that the user has not given an instruction of the pan tilt operation (No in step S206), the position adjusting unit 25 does not change the clipping region of the image clipping unit 24, that is, maintains the central region of the image data as is.

When it is determined that the user has given an instruction of the pan tilt operation (Yes in step S206), the control unit 23 generates a pan tilt operation signal corresponding to an operation. Then, the position adjusting unit 25 moves the clipping region in the image data with the enlarged image size from the central region in a direction according to an instruction of the pan tilt operation signal (step S207). For example, when the user performs the pan operation in the left direction; the position adjusting unit 25 moves the clipping region in a direction from the center of the image data to left. As a result, the image clipping unit 24 clips the rectangular region which has been moved in the left direction from the central region of the image data with the enlarged image size. Then, the display unit 21 displays the rectangular region (the rectangular region slid in the left direction from the center of the image data) clipped by the image clipping unit 24.

Further, when the user performs the pan tilt operation using the operating unit 22, the control unit 23 outputs the generated pan tilt operation signal to the communication unit 28. The communication unit 28 transmits the pan tilt operation signal to the imaging device 1 (step S208).

Thereafter, the control unit 23 determines whether or not a video stream in which the pan tilt operation has been reflected has been received from the imaging device 1 (step S209). In other words, the control unit 23 of the operating terminal 20 determines whether or not the video stream whose imaging direction is changed has been received. It is possible to determine whether or not the imaging direction is changed with reference to the imaging direction information added to the video stream. When it is determined that the video stream in which the pan tilt operation has been reflected has not been received (No in step S209), the position adjusting unit 25 changes the position of the clipping region according to the pan tilt operation, similarly to step S207.

However, when it is determined that the video stream in which the pan tilt operation has been reflected has been received (Yes in step S209), the position adjusting unit 25 moves the image clipping region to the center of the image data based on the imaging direction information added to the image data so that the image displayed on the display unit 21 does not move by a desired pan tilt angle or more (step S210).

Figure 7:
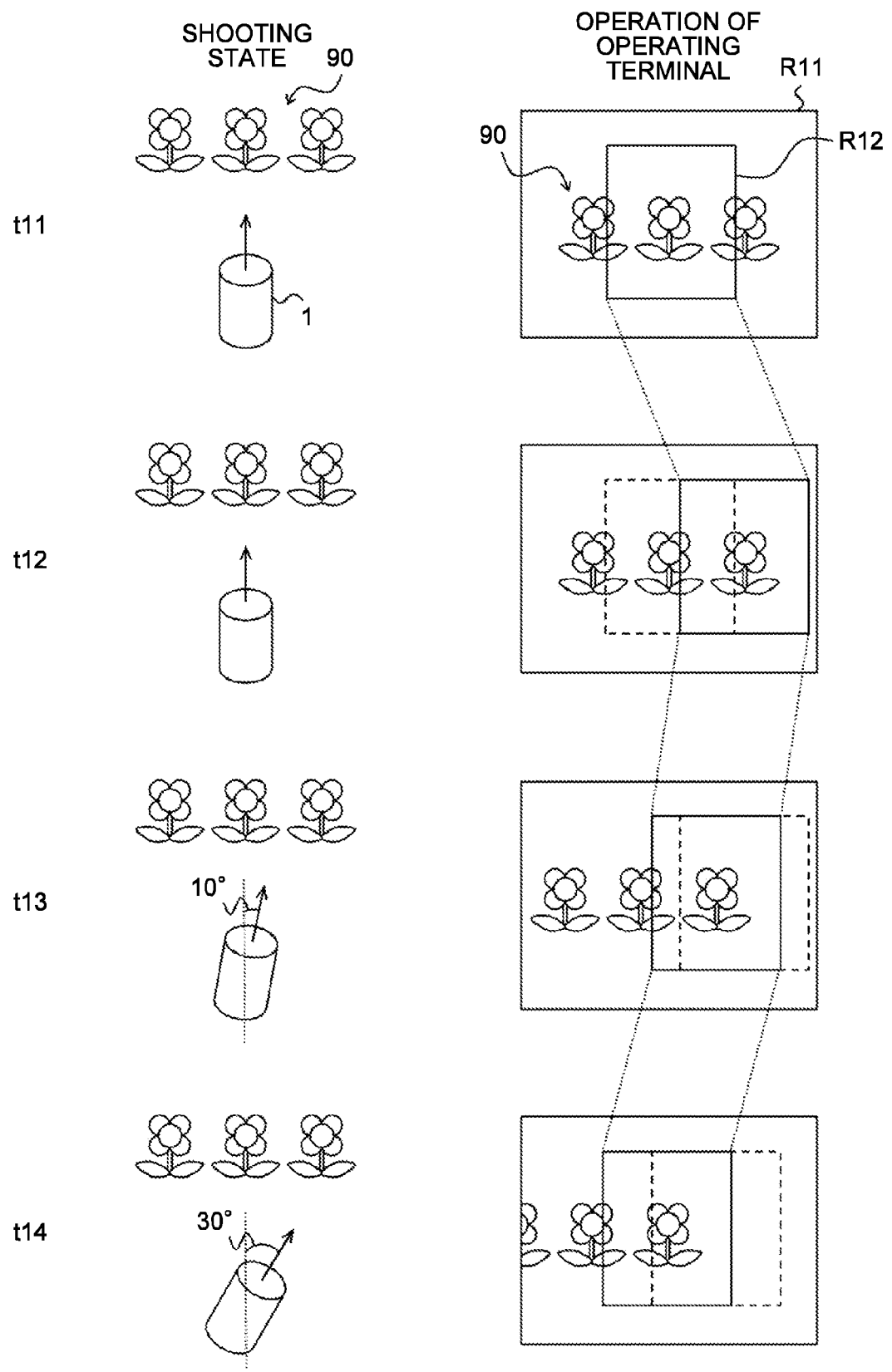
FIG. 7 is a diagram for describing an operation of an operating terminal according to an embodiment.

Here, an operation of the position adjusting unit 25 will be described with reference to FIG. 7. FIG. 7 is a diagram illustrating the pan angle (the imaging direction) of the imaging device 1 and the clipping image in the operating terminal 20 in time series.

At a time t11, the pan angle of the imaging device 1 is assumed to be 0° (faces the front). At the time t11, the user assumes to instruct a pan operation of 30° in the right direction using the operating unit 22. As a result, the position adjusting unit 25 moves the position of a clipping region R12 in a region R11 of the image data with the enlarged image size up to the position corresponding to the pan operation of 30°. Thus, at a time t12, an image of the clipping region R12 (the solid line region) corresponding to the pan angle 30° is displayed on the display unit 21. Further, the operating terminal 20 transmits the pan operation signal for instructing the pan operation of 30° in the right direction to the imaging device 1 according to an operation of the operating unit 22.

The pan tilt control unit 403 of the imaging device 1 commands the camera platform to perform the pan operation in the right direction based on the pan operation signal. At a time t13, the pan angle of the imaging device 1 is assumed to become 10°. Thus, the position of a subject 90 included in the region R11 of the image data transmitted from the imaging device 1 moves. At this time, when the position of the clipping region R12 is not adjusted and remains in the state of the time t12, an image (a dashed line region of t13) corresponding to the pan angle of 40°=30° (the pan angle by movement of the clipping region R12)+10° (the pan angle by which the imaging device 1 has actually moved)) is displayed on the display unit 21. In other words, an image panned by the pan angle desired by the user or more is displayed on the display unit 21.

For this reason, at the time t13, the position adjusting unit 25 moves the clipping region R12 in the direction (the left direction) opposite to the pan operation (the pan instruction direction) of the imaging device 1. In other words, the position adjusting unit 25 moves the clipping region R12 in the central direction of the region R11 by the amount corresponding to the pan angle operated by the imaging device 1. In the example of FIG. 7, the position adjusting unit 25 moves the position of the clipping region R12 in the central direction by the amount corresponding to the pan angle of 10°. Further, since the actual pan angle of the imaging device 1 is added for each frame as the imaging direction information, the operating terminal 20 can recognize the pan angle.

Thereafter, the position adjusting unit 25 moves the position of the clipping region R12 in the region R11 to the center of the region R11 based on the pan angle of the imaging device 1. When the pan angle of the imaging device 1 becomes 30°, that is, when the pan angle of the imaging device 1 becomes an angle instructed by the user, the clipping region R12 returns to the central region of the region R11 (at a time t14). As a result, a video with a desired pan angle is displayed on the display unit 21 without being shaken.

Of course, in FIG. 7, for the sake of convenience of description, at the time t13, the position adjusting unit 25 moves the clipping region R12 to the center at once by the pan angle of 10°. Actually, the position adjusting unit 25 changes the position of the clipping region R12 in the region R11 based on the imaging direction information each time the imaging direction information added to the image data is changed. In other words, the clipping region R12 moves in the direction opposite to the direction in which the imaging direction of the imaging device 1 changes. At this time, the image interpolation process may be performed in order to more smoothly display the clipping region R12 (the display region).

Referring back to the flowchart of FIG. 6, the control unit 23 determines whether or not the hand of the user has gotten away from the operating unit 22 by a predetermined distance or more based on the detection result of the proximity sensor 27 (step S211). When it is determined that the hand of the user has not gotten away from the operating unit 22 by a predetermined distance or more (No in step S211), the position adjusting unit 25 adjusts the position of the clipping region according to an operation of the operating unit 22.

However, when it is determined that the hand of the user has gotten away from the operating unit 22 by a predetermined distance or more (Yes in step S211), the size change instructing unit 26 instructs the imaging device 1 to get the image size of the image data to be transmitted back to the original image size (the normal image size) (step S212). Thus, the imaging device 1 generates a video stream using the image data with the normal image size, and transmits the generated video stream to the operating terminal 20 (see step S108 of FIG. 4).

Then, the operating terminal 20 acquires the image data with the normal image size (step S213). Thus, the operating terminal 20 ends the image clipping process by the image clipping unit 24 (step S214). In other words, the display unit 21 displays the image data with the normal image size received via the communication unit 28 as is without changing the size. That is, when the communication unit 28 receives the image data with the normal image size, the image clipping unit 24 does not perform the clipping process. Then, the display unit 21 displays the image based on the received image data which has not been subjected to the clipping process.

Figure 8:
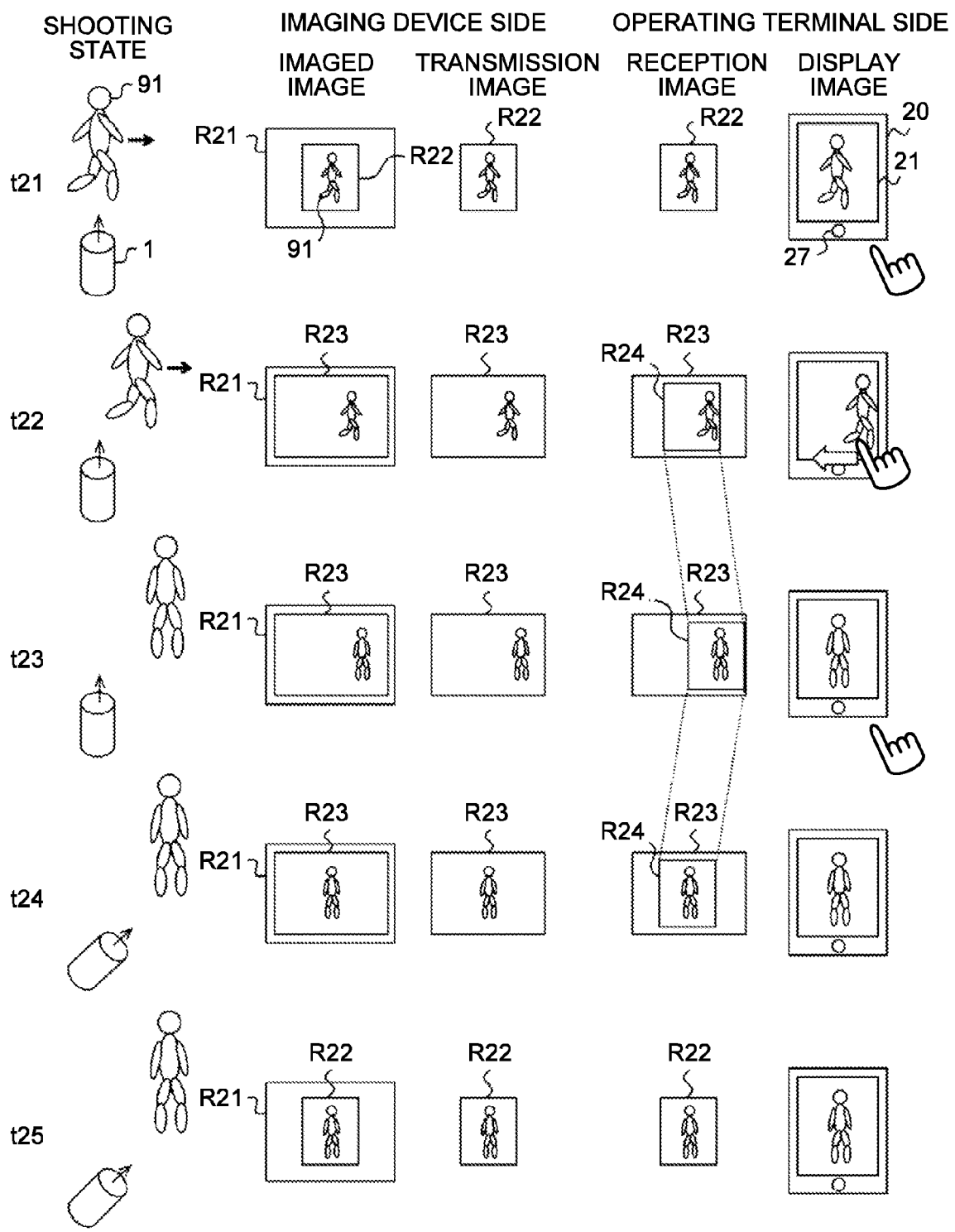
FIG. 8 is a diagram for describing operations of an imaging device and an operating terminal according to an embodiment.

Here, the operations of the imaging device 1 and the operating terminal 20 will be described with reference to a concrete example illustrated in FIG. 8. FIG. 8 is a diagram illustrating a change in the imaging direction of the imaging device 1, image data generated by the imaging process, transmission image data of the imaging device 1, reception image data of the operating terminal 20, and a display image of the operating terminal 20 in time series. In the example of FIG. 8, a subject 91 is assumed to move in the right direction and then stop its movement.

First of all, at a time t21, the subject 91 starts to move in the right direction. At this time, image data of a region R21 is generated in the imaging device 1 by the imaging process. Then, the image clipping unit 401: clips image data (image data with the normal image size) of a rectangular region R22 at the center of the region R21; and generates transmission image data. Further, at the time t21, the subject 91 is assumed to be positioned at the center of the region R21. Thus, the subject 91 is also included in the clipping image data (the region R22). The image data of the clipped rectangular region R22 is transmitted to the operating terminal 20.

In the example illustrated in FIG. 8, the image size of the region R22 clipped from the image data of the region R21 generated by the imaging process is the same size as the image size (the normal image size) of the display image of the display unit 21 at the operating terminal 20 side, but the present invention is not limited to this example. For example, image data with the size larger than the image size (the normal image size) of the display image of the operating terminal 20 side is clipped from the image data of the region R21. Then, an image obtained by resizing the image size (an image in which the number of pixels matches with the number of pixels of the display unit 21 at the operating terminal 20 side) of the clipped image data may be generated in the imaging device 1, and then transmitted to the operating terminal 20. However, image data with the size smaller than the image size (the normal image size) of the display image of the operating terminal 20 side may be clipped from the image data of the region R21, and then the image size of the corresponding image data may be resized (increase of the number of pixels) according to the number of pixels of the display unit 21 at the operating terminal 20 side. When resizing is performed, the imaging device 1 may add information related to the number of pixels of image data before resizing (original image data generated by the imaging process) and information related to a magnification ratio of size adjusting to transmission image data. Thus, in a side of the operating terminal 20, it is possible to display the image of before resizing based on the information related to the number of pixels before resizing and the information related to the magnification ratio of before resizing.

The display unit 21 displays the image of the received rectangular region R22 as is. In other words, the display unit 21 displays the received image without performing the clipping process on the received image data via the image clipping unit 24. Thus, the display unit 21 of the operating terminal 20 displays the subject 91 that starts to move in the right direction. Here, the user anticipates that the subject 91 will get out of the display unit 21, and moves his/her hand closer to the operating terminal 20 for performing pan operation. Thus, the approach of the hand of the user is detected by the proximity sensor 27 of the operating terminal 20. Thus, the size change instructing unit 26 transmits the size change instruction signal for increasing the image size of the transmission image data from the operating terminal 20 to the imaging device 1.

At a time t22, the position of the subject 91 is assumed to move in the right direction. For this reason, the imaging device 1 generates image data in which the subject 91 is positioned at the position which is deviated in the right direction from the center of the region R21.

At the time t21, since an instruction for increasing the image size of the transmission image data is given, the size changing unit 402 of the imaging device 1 increases the size of an image to be clipped by the image clipping unit 401. Thus, the image clipping unit 401 clips a rectangular region R23 with the size (the enlarged image size) larger than the rectangular region R22 from the region R21. The image data of the clipped rectangular region R23 is transmitted to the operating terminal 20.

The image clipping unit 24 of the operating terminal 20 clips a central region R24 (a predetermined region) of the received rectangular region R23. At this time, the image size of the display unit 21 and the image size of the region R24 are assumed to be the image data of the same as each other. Then, the display unit 21 displays the image clipped by the image clipping unit 24. Since the subject 91 has moved in the right direction from the center of the region R21, the position of the subject 91 displayed on the display unit 21 is positioned at the right end of the display unit 21. The user performs the pan operation in the right direction using the operating unit 22 so that the subject 91 does not get out of the display unit 21. In the example of FIG. 8, since the operating terminal 20 is the smartphone having the touch panel, the user gives an instruction for performing the pan operation in the right direction by swiping his/her finger on the display unit 21 in the left direction. Thus, the pan operation signal is transmitted to the imaging device 1.

The image size of the clipped image data (the region R24) needs not be necessarily equal to the image size of the display unit 21. In other words, when image data having the number of pixels larger than the number of pixels of the display unit 21 is clipped, resizing of decreasing the number of pixels may be performed, and then an image after resizing may be displayed. Further, when image data having the number of pixels smaller than the number of pixels of the display unit 21 is clipped, resizing of increasing the number of pixels may be performed, and then an image after resizing may be displayed.

The position adjusting unit 25 adjusts the position of the clipping region R24 in the reception image data (the image data of the rectangular region R23) in response to the pan operation signal (a time t23). Specifically, the position of the clipping region R24 is moved in the right direction from the center. Thus, the subject 91 is positioned at the center of the clipping region. As a result, the subject 91 is positioned at the center of the image displayed on the display unit 21.

At this time, due to influence of a delay occurring in the wireless communication path, the pan operation signal transmitted from the operating terminal 20 at the time t22 is assumed not to arrive at the imaging device 1 at the time t23. For this reason, even at the time t23, the imaging direction of the imaging device 1 does not change. In the present embodiment, as described above, when the hand of the user approaches the operating unit 22 by making the approach as a trigger, the image data with the enlarged image size is transmitted from the imaging device 1. Thus, even when the pan operation signal does not actually arrive at the imaging device 1, the position adjusting unit 25 can move the display image in the direction desired by the user by moving the position of the clipping region R24 in the region R23 of the received image data. In other words, the display unit 21 of the operating terminal 20 displays the image obtained by the pan operation without waiting for reception of the image data imaged after the pan operation of the imaging device 1. As a result, the image to be displayed on the display unit 21 can be smoothly moved without a time lag (a delay caused by the communication path) until the display image is moved after the pan operation is performed. In other words, the image can be displayed according to the pan tilt operation without giving an uncomfortable feeling to the user.

Further, at the time t23, the subject 91 is assumed to stop moving in the right direction. For this reason, at the time t23, the user is assumed to stop the pan operation. However, the user maintains the state in which his/her hand is close to the operating unit 22.

At a time t24, upon receiving the pan operation signal representing the right direction, the imaging device 1 starts the pan operation. As a result, the subject 91 moves to the center of the image data. Then, the imaging device 1 transmits the image data (the region R23) with the enlarged image size. At this time, the pan tilt amount adding unit 404 adds the pan angle (the imaging direction information) detected by the gyroscope sensor 208 to the image data to be transmitted.

When the operating terminal 20 receives the image data, the position adjusting unit 25 adjusts the position of the clipping region R24 in the image data of the region R23 based on the pan angle added to the image data. Specifically, as described above with reference to FIG. 7, the position adjusting unit 25 moves the region R24 by the amount corresponding to the pan angle added to the image data in the direction (the left direction) opposite to the direction of the pan operation of the imaging device 1.

In other words, in accordance with the change in the pan angle of the imaging device 1, the position of the clipping region R24 in the image data of the region R23 changes. In other words, even when the pan angle of the imaging device 1 changes, the relative position between the clipping region in the operating terminal 20 and the subject 91 does not change. As a result, at the time t23 and at the time t24 which differ in the imaging direction of the imaging device 1 from each other, the position of the subject 91 in the image displayed on the display unit 21 of the operating terminal 20 does not change.

Here, since the subject 91 does not move, the user thinks that the pan operation needs not be performed, and gets his/her hand away from the operating unit 22. As a result, the hand of the user gets away from the operating unit 22 by a predetermined distance or more. Then, the proximity sensor 27 detects that the hand of the user is not close by. As a result, the size change instructing unit 26 instructs the imaging device 1 to transmit the image data with the normal image size based on the detection result of the proximity sensor 27.

At a time t25, the imaging device 1 receives the size change instruction signal transmitted from the operating terminal 20. Then, the size changing unit 402 restores the region of the clipping image to the original state. In other words, the size changing unit 402 instructs the image clipping unit 401 to clip the image data of the clipping region R22 (the normal image size) at the time t21.

The image clipping unit 401 clips the region R22 from the image data based on an instruction from the size changing unit 402. Then, the image data of the region R22 is transmitted from the imaging device 1 to the operating terminal 20. Upon receiving the image data with the normal image size, the control unit 23 of the operating terminal 20 causes the received image data to be displayed on the display unit 21 without causing the image clipping unit 24 to perform the clipping process. As a result, at the time t24 and at the time t25 which differ in the size of the received image from each other, the display image of the display unit 21 of the operating terminal 20 does not change. In other words, a communication band can be suppressed by reducing the size of the image to be transmitted. In other words, according to the imaging system of the present embodiment, when the quality of the display image is kept constant, the communication band can be suppressed during a period of time in which control (pan tilt) is not performed on the imaging device. Meanwhile, when the communication band is kept constant (when the communication band is limited), the imaging device 1 needs to compress the image data with the enlarged image size and then transmit the compressed image data. However, according to the imaging system of the present embodiment, a period of time in which image data is compressed (a period of time in which the quality of the display unit 21 gets worse) can be limited to a period of time in which control (pan tilt) is performed on the imaging device 1.

As described above, according to the configuration of the operating terminal 20 of the present embodiment, the position adjusting unit 25 adjusts the position of the clipping region (a predetermined region) in the received image data with the enlarged image size based on the imaging direction information. The image clipping unit 24 clips the image data of the adjusted clipping region. Then, the image is displayed on the display unit 21 based on the clipped image data. In other words, the position of the region to be clipped in the operating terminal 20 also changes depending on the change in the imaging direction of the imaging device 1. For this reason, even when the position of the subject in the generated image data changes, the relative position between the clipping region and the subject does not change. As a result, the position of the subject displayed on the display unit 21 does not change either. Thus, the display unit 21 can display the stable image.

Further, the present invention is not limited to the above embodiments, and appropriate changes and combinations can be made within a range not departing from the gist. For example, the above description has been made in connection with the example in which the imaging device 1 performs the pan operation, but the present invention can be similarly applied to the tilt operation. Furthermore, the above embodiment has been described in connection with the mechanical pan tilt operation by which the imaging direction is changed by rotating the camera platform, but the present invention can be also applied to an electronic pan tilt operation.

In addition, the image clipping unit 24 of the operating terminal 20 clips the central region of the image data immediately after receiving the image data with the enlarged image size, but the present invention is not limited to this example. The position of a region to be clipped by the image clipping unit 24 of the operating terminal 20 may be the position corresponding to a region with the normal image size to be clipped by the image clipping unit 401 of the imaging device 1. When the position of a region to be initially clipped by the image clipping unit 24 of the operating terminal 20 is set outside the central region of the image data, the clipping region can be specified by further adding coordinates of an image to be clipped by the image clipping unit 401 to the transmission image data.

Further, the present invention is not limited to the above embodiments, and appropriate changes and combinations can be made within a range not departing from the concept of the invention. Further, the processes of the imaging device 1 and the operating terminal 20 can be executed according to a computer program stored in a ROM of a main processor or the like. In the above example, a program including a group of command causing a computer (a processor) to perform each process may be stored using various types of non-transitory computer readable media and supplied to a computer. Various types of tangible storage media may be used as the non-transitory computer readable medium. Examples of the non-transitory computer readable medium include a magnetic recording medium (for example, a flexible disk, a magnetic tape, and a hard disk drive), a magneto optical recording medium (for example, a magneto optical disk), a compact disk read only memory (CD-ROM), a CD-R, a CD R/W, and a semiconductor memory (for example, a mask ROM, a programmable ROM (PROM), an erasable PROM (EPROM), a flash ROM, a read access memory (RAM)). Further, the program may be supplied to a computer by various types of transitory computer readable media. Examples of the transitory computer readable medium include an electric signal, an optical signal, and an electromagnetic wave. The transitory computer readable medium can supply the program to a computer through a wired communication path such as an electric cable or an optical fiber or a wireless communication path.

According to the embodiments of the present invention, it is possible to provide a communication device, an imaging device, an imaging system, and a computer program product, which are capable of displaying a stable image.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A communication device, comprising:
   a receiving unit that receives image data generated by an imaging process of an imaging device facing a predetermined imaging direction and imaging direction information representing the predetermined imaging direction;
   an operating unit that generates direction instruction information indicating an imaging direction of the imaging device in response to an operation of a user;
   an image clipping unit that clips a predetermined region of the image data;
   a display unit that displays an image based on the image data of the predetermined region;
   a region position adjusting unit that adjusts a position of the predetermined region in the image data based on the imaging direction information and the direction instruction information;
   an operation start detecting unit that detects whether a hand of the user approaches the operating unit;
   a size change instructing unit that generates size change instruction information instructing the imaging device to change an image size of the image data to be transmitted by the imaging device from a first size to a second size larger than the first size, when the operation start detecting unit detects that the hand of the user approaches the operating unit; and a transmitting unit that transmits the size change instruction information to the imaging device, wherein when the image data received by the receiving unit is an image with the first size, the image clipping unit does not perform clipping of the image data of the predetermined region, and the display unit displays an image based on the image data received by the receiving unit.

2. An imaging system, comprising:

an imaging device; and a communication device that operates the imaging device, wherein the imaging device is connected with the communication device via a communication path, the imaging device includes an imaging unit that generates image data through an imaging process, an imaging direction detecting unit that detects an imaging direction in which the imaging unit performs an imaging process, and a transmitting unit that transmits the image data and imaging direction information representing an imaging direction detected by the imaging direction detecting unit to the communication device, and the communication device includes a receiving unit that receives the image data and the imaging direction information, an operating unit that generates direction instruction information indicating an imaging direction of the imaging device in response to an operation of a user, an image clipping unit that clips a predetermined region of the image data, a display unit that displays an image based on the image data of the predetermined region, and a region position adjusting unit that adjusts a position of the predetermined region in the image data based on the imaging direction information and the direction instruction information;

an operation start detecting unit that detects whether a hand of the user approaches the operating unit;

a size change instructing unit that generates size change instruction information instructing the imaging device to change an image size of the image data to be transmitted by the imaging device from a first size to a second size larger than the first size, when the operation start detecting unit detects that the hand of the user approaches the operating unit; and a transmitting unit that transmits the size change instruction information to the imaging device, wherein when the image data received by the receiving unit is an image with the first size, the image clipping unit does not perform clipping of the image data of the predetermined region, and the display unit displays an image based on the image data received by the receiving unit.

3. A computer program product comprising a non-transitory computer usable medium having computer readable program causing a computer to execute:

receiving image data generated by an imaging process of an imaging device facing a predetermined imaging direction and imaging direction information representing the predetermined imaging direction;

generating direction instruction information indicating an imaging direction of the imaging device in response to an operation of a user;

clipping a predetermined region of the image data;

displaying an image based on the image data of the predetermined region;

adjusting a position of the predetermined region in the image data based on the imaging direction information and the direction instruction information;

detecting whether a hand of the user approaches;

generating size change instruction information instructing the imaging device to change an image size of the image data to be transmitted by the imaging device from a first size to a second size larger than the first size, when detecting that the hand of the user approaches; and transmitting the size change instruction information to the imaging device, wherein when the image data received at the receiving is an image with the first size, the clipping does not include clipping the image data of the predetermined region, and the displaying includes displaying an image based on the image data received at the receiving.

* * * * *